United States Patent
Bell et al.

(10) Patent No.: US 7,219,929 B2
(45) Date of Patent: May 22, 2007

(54) SEAT BELT PRETENSIONER

(75) Inventors: John Bell, Carlisle (GB); Brian A. Jack, Annan (GB); David Hunter, Carlisle (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 479 days.

(21) Appl. No.: 10/874,911

(22) Filed: Jun. 24, 2004

(65) Prior Publication Data

US 2005/0206153 A1 Sep. 22, 2005

(30) Foreign Application Priority Data

Mar. 22, 2004 (EP) .................. 04251646

(51) Int. Cl.
*B60R 22/36* (2006.01)
(52) U.S. Cl. .................... 280/806
(58) Field of Classification Search ............. 280/801.1, 280/801.2, 806; 297/216.15, 216.16, 216.17, 297/216.18, 216.19, 470, 471, 472
See application file for complete search history.

(56) References Cited

U.S. PATENT DOCUMENTS

| | | |
|---|---|---|
| 5,374,110 A | 12/1994 | Hiramatsu |
| 5,397,075 A | 3/1995 | Behr |
| 5,564,748 A | 10/1996 | Kmiec et al. |
| 5,639,120 A | 6/1997 | Kmiec et al. |
| 5,887,897 A | 3/1999 | Gill et al. |
| 5,911,440 A | 6/1999 | Ruddick et al. |
| 5,944,350 A | 8/1999 | Grabowski et al. |
| 5,967,440 A | 10/1999 | Marshall |
| 5,971,488 A | 10/1999 | Pedronno et al. |
| 6,036,274 A | 3/2000 | Kohlndorfer et al. |
| 6,039,353 A | 3/2000 | Bauer et al. |
| 6,113,145 A | 9/2000 | Evans |
| 6,142,524 A | 11/2000 | Brown et al. |
| 6,193,296 B1 | 2/2001 | Motozawa et al. |
| 6,213,511 B1 | 4/2001 | Downie et al. |
| 6,213,513 B1 | 4/2001 | Grabowski et al. |
| 6,238,003 B1 | 5/2001 | Miller, III et al. |
| 6,419,271 B1 | 7/2002 | Yamada et al. |
| 2002/0043796 A1 | 4/2002 | Webber et al. |
| 2003/0010560 A1* | 1/2003 | Motozawa ............ 180/268 |
| 2003/0029661 A1 | 2/2003 | Motozawa |
| 2003/0090101 A1 | 5/2003 | Ennerdal |
| 2003/0122362 A1 | 7/2003 | Ukita et al. |
| 2003/0230661 A1 | 12/2003 | Bell et al. |
| 2004/0046382 A1 | 3/2004 | Ball et al. |

FOREIGN PATENT DOCUMENTS

| | | | |
|---|---|---|---|
| DE | 3341678 A1 * | 5/1985 | |
| JP | 50-35815 | 4/1975 | |
| JP | 01-285438 | 11/1989 | |

(Continued)

*Primary Examiner*—Faye M. Fleming
(74) *Attorney, Agent, or Firm*—Lonnie R. Drayer

(57) ABSTRACT

A pretensioner for a three point vehicle safety restraint seat belt has a mounting for one end of the seat belt. The mounting has a first member fixed to a load bearing part of the vehicle and a second member attached to the end of the seat belt. A force reservoir, such as a pyrotechnic unit, moves the second member relative to the first member in a pretensioning direction in response to activation by a crash sensor.

14 Claims, 3 Drawing Sheets

| | FOREIGN PATENT DOCUMENTS | |
|---|---|---|
| JP | 02-147454 | 6/1990 |
| JP | 3153441 | 7/1991 |
| JP | 5085306 | 4/1993 |
| JP | 5105029 | 4/1993 |
| JP | 7196011 | 8/1995 |
| JP | 2001163179 | 6/2001 |
| JP | 2001213277 | 8/2001 |
| JP | 2001247010 | 9/2001 |
| JP | 2001301565 | 10/2001 |
| JP | 2002145013 | 5/2002 |
| JP | 2002211352 | 7/2002 |
| JP | 2002211353 | 7/2002 |
| JP | 2002211354 | 7/2002 |
| JP | 2002308045 | 10/2002 |
| JP | 2002337660 | 11/2002 |
| JP | 2002362311 | 12/2002 |
| JP | 2003025939 | 1/2003 |
| JP | 2003054360 | 2/2003 |
| JP | 2003081053 | 3/2003 |
| JP | 2003127829 | 5/2003 |

\* cited by examiner

SEAT BELT PRETENSIONER

FIELD OF THE INVENTION

The present invention relates to a seat belt pretensioner that can be used in a vehicle.

BACKGROUND OF THE INVENTION

Traditionally a seat belt safety restraint comprises a length of belt webbing connected at three points to load bearing parts of a vehicle. Typically one end is bolted to a door sill on one side of the seat, arranged to pass laterally across the hips of the vehicle occupant to a buckle mechanism fixed to the vehicle on the opposite side of the seat, and then diagonally across the torso of the vehicle occupant to a further fastening point on the B pillar of the door. The buckle mechanism engages a buckle tongue attached to the belt webbing in a slidable manner.

To increase comfort for the vehicle occupant restrained by the belt, a retractor is fitted at the pillar end of the webbing. This allows the webbing to pay out under relatively low loads to enable limited movement of the restrained vehicle occupant, for example to reach in-car entertainment controls or storage compartments. The retractor is biased to keep the webbing relatively taut about the vehicle occupant and a locking element is included to lock the retractor against webbing pay out in the event of a dangerous situation being detected. For example, an acceleration sensor activates if the vehicle undergoes rapid acceleration or deceleration indicative of a crash.

In recent years, pretensioners have been introduced to rapidly pull in a length of webbing to actively tighten the belt about the vehicle occupant in the event of a crash condition being sensed. This takes up any slack that may have developed in the belt and helps to more correctly position the vehicle occupant in the seat to maximise the effect of the belt protection and of any secondary safety restraint such as an airbag.

Pretensioners comprise a force reservoir such as a pyrotechnically operated gas generator to provide an impulse of sufficient magnitude to tighten the belt in a short space of time, ideally before the crash pulse takes full effect. A typical known pretensioner uses rotational means to wind in a length of seat belt webbing, for example by rotating the retractor spool in a webbing rewind direction to take in the required length of webbing prior to the retractor locking against webbing pay out.

However, known pretensioners tend to be bulky, and are particularly difficult to use for the driver, and front passenger, seat of a three door vehicle because of the requirement to allow access to the rear of the vehicle past the front seats. Using a traditional retractor pretensioner mechanism in a front seat of a three door vehicle causes an unacceptable obstruction.

Seat travel is greater in a three door vehicle than in a four door vehicle in order to provide such access and to accommodate this the door sill end of the webbing is usually attached to a so-called slider bar of well known design, instead of being fixedly bolted to the floor. This allows the sill end of the webbing to be moved longitudinally forward and rearward to facilitate rear seat access and front seat movement.

The present invention provides an improved pretensioning mechanism that can be used in three-door, front seat applications.

SUMMARY OF THE INVENTION

According to the present invention there is provided a pretensioner for a three point vehicle safety restraint seat belt, comprising a mounting for one end of the seat belt, the mounting comprising a first member fixed to a load bearing part of the vehicle and a second member attached to the end of the seat belt, and means for moving the second member translationally relative to the first member in a pretensioning direction in response to activation of a crash sensor.

BRIEF DESCRIPTION OF THE DRAWINGS

For a better understanding of the present invention, and to show how the same may be carried into effect, reference will now be made, by way of example, to the accompanying drawings, in which.

DETAILED DESCRIPTION OF THE INVENTION

Figure 1:
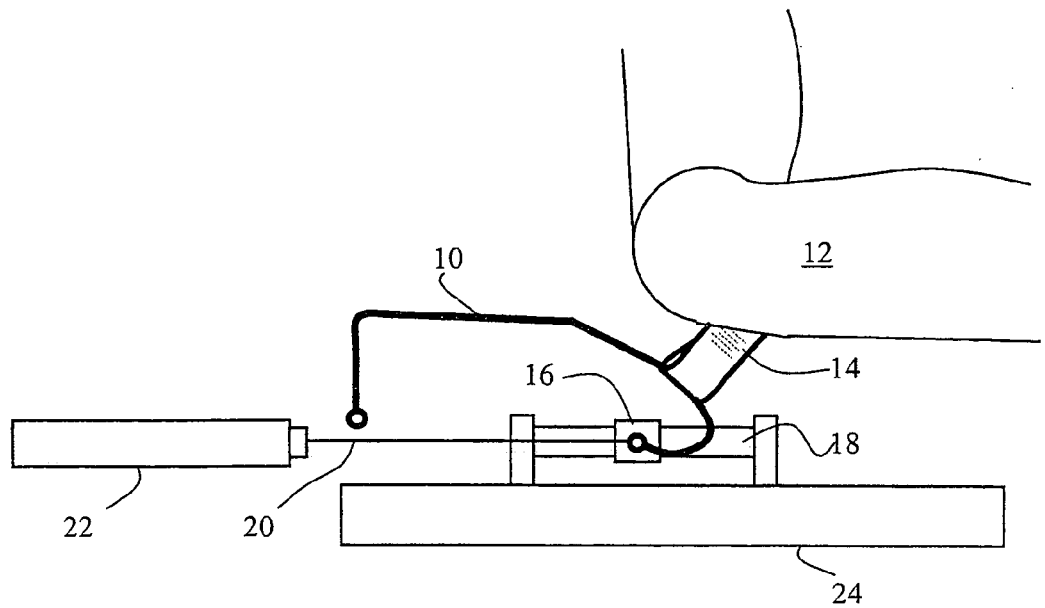
FIG. 1 is a schematic side view of a pretensioner according to the present invention.

FIG. 1 shows a slider bar 10 positioned adjacent to a front seat 12 of a vehicle. One end of seat belt webbing 14 passes around the slider bar 10 and is free to move back and forth along the slider bar 10.

The seat belt webbing 14 is of a conventional design and is attached at one end to a retractor mounted, adjacent a seat, to a load bearing part of the vehicle such as a vehicle side pillar (not shown). The webbing passes through a shoulder support also attached to the side pillar and has a buckle tongue, which is insertable into a buckle (not shown) located on the other side of the seat.

When in use, the seat belt webbing 14 is at one end of the slider bar 10 in the load bearing position shown in FIG. 1 to provide suitable compact anchorage with flexibility to allow access to rear seats in a three-door vehicle. When the seat belt is not in use the end of the webbing 14 may be moved in a rearward direction along the slider bar 10 so that it does not obstruct access to the rear seat of the vehicle.

One end of the slider bar 10 is attached to a carriage 16 which is mounted on a rail 18. The carriage may advantageously be arranged to slide in only the pretensioning direction along the rail upon activation of the force reservoir, being restrained from return motion in the opposite direction, for example by a ratchet mechanism comprising teeth incorporated into a surface of the rail.

Locking the pretensioner against return movement in this way prevents a loss of tension in the seat belt after pretensioning has been carried out. Ratchets are known for different seat belt restraint applications and so the pretensioner of the present invention can advantageously be constructed using standard parts and manufacturing processes, and thus offers a relatively low cost locking mechanism.

A cable 20 extends between the carriage 16 and a pyrotechnic unit 22. A means for moving the carriage 16 comprises a force reservoir such as a pyrotechnically operated unit 22. Such a pyrotechnic unit is particularly suited to this application since it provides an impulse of the required magnitude over a short time period. The pyrotechnic unit 22 is of a known type and contains a piston within a cylindrical housing and a gas generator. The gas generator is pyrotechnically activated to provide an impulse which forces the piston in a rearward direction and tensions the cable 20. The activation of the force reservoir drives the piston along the cylinder and the piston pulls the cable and thus pulls the carriage along the rail. The use of a rail is particularly beneficial since the pretensioning action can be constrained to a linear motion in one direction in a simple manner and without the need for complicated or bulky rotating parts. Pretensioners can be constructed according to the invention with reduced or eliminated obstruction to rear seat access, smaller package sizes and which are attached to an appropriate sill anchorage zone. Positioning the piston and cylinder below the rail advantageously reduces the overall size of the pretensioner.

Figure 2:
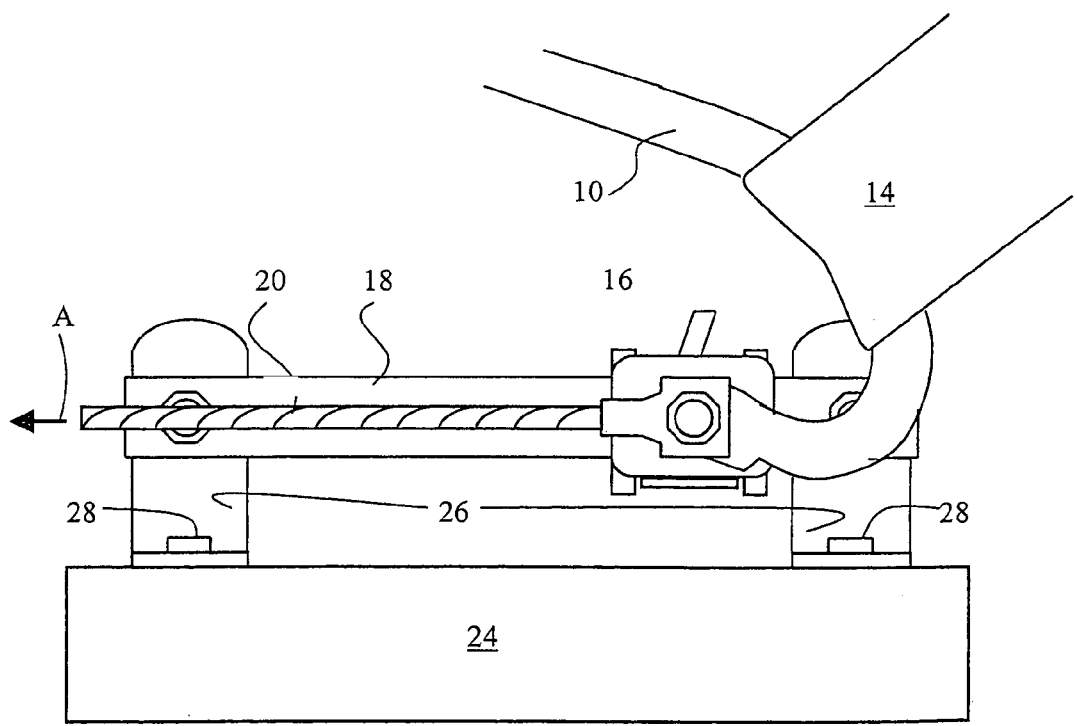
FIG. 2 is an enlarged view of part of the pretensioner of FIG. 1 before pretensioning.

FIG. 2 shows one arrangement of the carriage 16 and the rail 18 in greater detail. The rail 18 is attached at each end to support members 26 that are fixed to a load bearing chassis member 24 by means of bolts 28. Such a load bearing chassis member 24 may be a chassis member extending in a longitudinal direction down each side of the vehicle, such as a load bearing door sill and provides a suitable load bearing anchorage zone for the slider bar 10 adjacent to and slightly to the rear of each of the vehicle doors.

Prior to pretensioning, the carriage 16 is positioned for normal use of the seat belt webbing 14 at its forward most position, at the right hand side as shown in FIG. 2 of the rail 18. Upon sensing an acceleration of the vehicle above a predetermined criteria, a crash sensor, in known manner, generates a signal indicative of a crash condition which causes the pyrotechnic unit 22 to fire, creating a tension in the metal cable 20. Advantageously the crash sensor is activated when the vehicle exceeds a predetermined acceleration or deceleration threshold. The tension in the cable 20 pulls the carriage 16 and the slider bar 10 in a rearward direction i.e. the direction of arrow A in FIG. 2. The carriage 16 can be arranged to move rearwardly a distance in the region of 50 to 150 mm depending on the vehicle size and requirements.

The sudden movement of the slider bar 10 in a rearward direction provides tension in the seat belt webbing 14, which takes up any slack in the webbing 14 and pulls a vehicle occupant backwards into the seat 12 so as to correctly position the vehicle occupant within the seat 12 in order to maximise the benefit of the seat belt and correctly position him for maximum effect of any secondary restraint such as an airbag.

Figure 3:
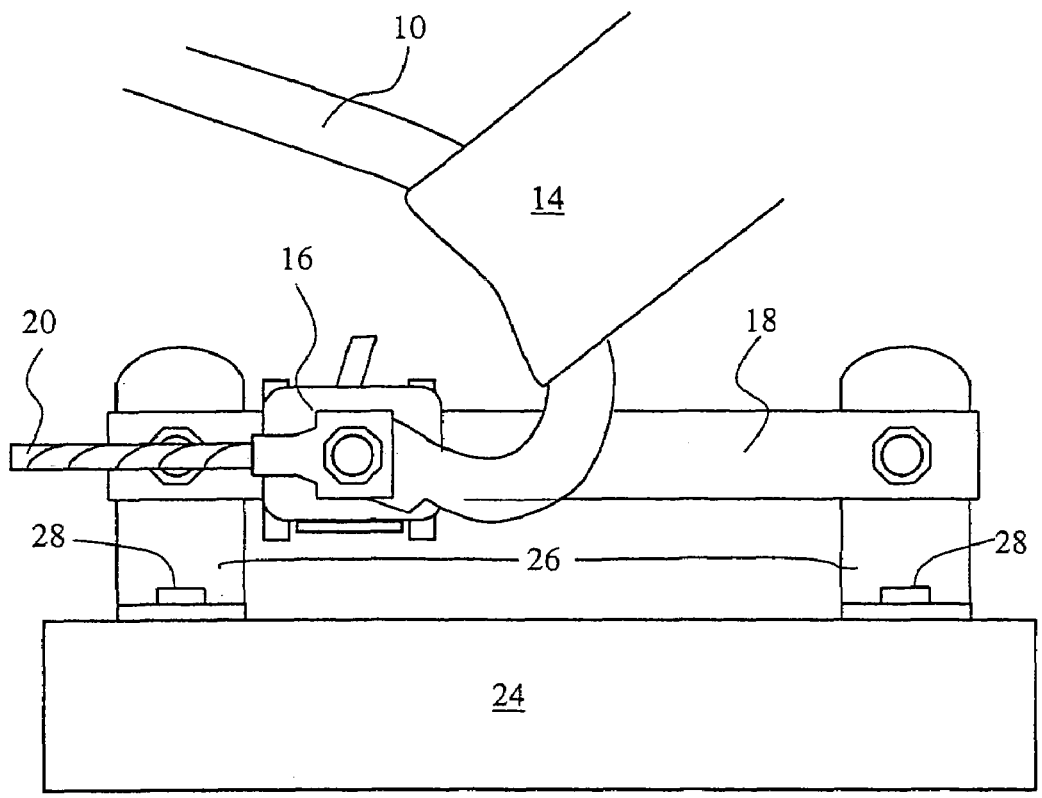
FIG. 3 is an enlarged view of part of the pretensioner of FIG. 1 after pretensioning.
Figure 5:
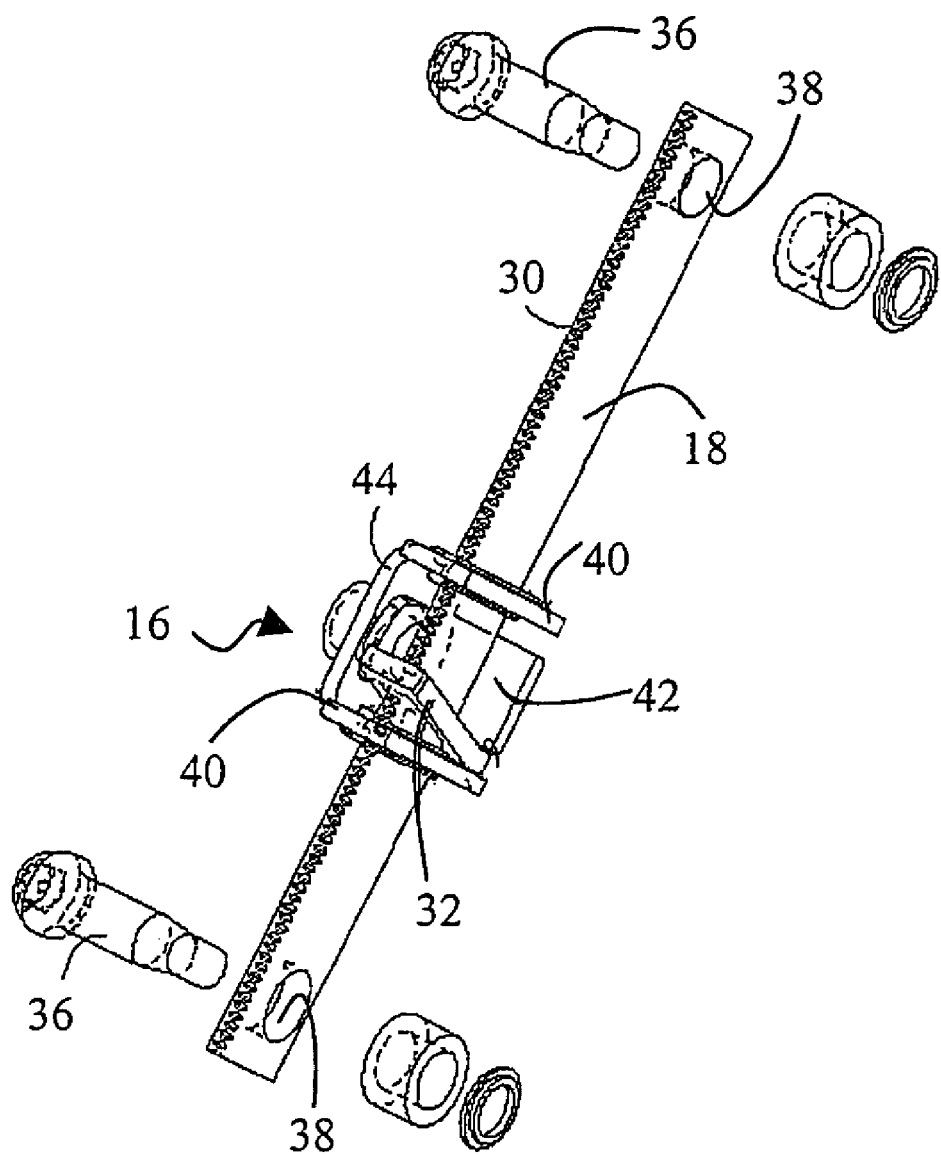
FIG. 5 is an enlarged perspective view of the carriage and rail arrangement of FIG. 1.

FIG. 3 shows the position of the carriage immediately after pretensioning. After the pyrotechnic unit has fired, the carriage 16 is prevented from returning to its original position under the forward momentum of the vehicle occupant during a crash, by a ratchet mechanism within the carriage 16 which is shown more clearly in FIG. 5.

The rail 18 is attached at each of its ends to respective support members 26 by means of bolts 36 passing through cylindrical holes 38 at each end of the rail 18. Locking ratchet teeth 30 are formed in one surface of the rail 18. The carriage 16 has two end plates 40 and a base plate 42 attached to a side wall 44. A locking lever 32 extends from the base plate 42. Each of the end plates 40 and the locking lever 32 has a slot, allowing the rail 18 to pass through the centre of the carriage 16.

An inner surface of the locking lever 32 is in contact with the teeth 30 in the surface of the rail 18 and is orientated at an angle such that the locking lever 32 can pass over the teeth 30 in one direction. However the locking lever 32 is biased such that if it tries to move in the opposite direction, a locking edge of the inner surface of the locking lever 32 will be caught against a tooth 30 on the upper surface of the rail 18 and thus prevents the carriage 16 from sliding in a reverse direction. To facilitate this the teeth 30 may be of a saw-tooth form.

The slider bar 10, the carriage 16 and ratchet mechanism, the rail 18, the support members 26 and the bolts 28, 36 and 46 are all preferably made of metal. The ratchet mechanism and the carriage 16 may be formed from both parts of a height adjuster traditionally used to alter the height of the belt shoulder support.

Figure 4:
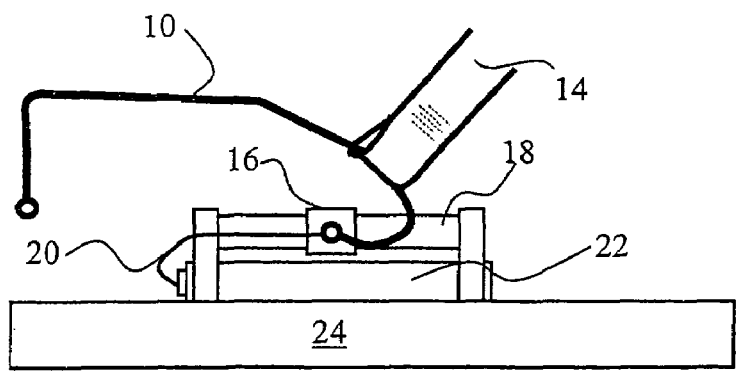
FIG. 4 is a side view of an alternative arrangement of the pretensioner of FIG. 1.

In FIG. 4 the pyrotechnic unit is shown stored beneath the rail 18 and the bolts 36 and corresponding holes 38 in the rail may be used to fix the pyrotechnic unit 22 in relation to the rail 18. The operation of the pretensioner in FIG. 4 is substantially the same as that shown in FIG. 1, except that the cable 20 bends 180° in order to cater for the different orientation of the pyrotechnic unit 22.

It is understood that the invention is not limited to the particular construction and arrangement of parts herein illustrated and described, but embraces all such modified forms thereof as come within the scope of the following claims.

We claim:

1. A pretensioner for a three point seat belt comprising: a mounting for a sill end of the seat belt, the mounting comprising a first member adapted to be fixed to a load bearing part of a vehicle and a second member attached to the end of the seat belt, and a means for moving the second member translationally relative to the first member in a pretensioning direction when activated by a crash sensor, the first member comprising a means for restraining motion of the second member in a non-pretensioning direction, wherein the means for restraining motion of the second member comprises ratchet teeth formed in a surface of a rail.

2. The pretensioner according to claim 1 wherein the mounting further comprises a slider bar connecting the second member to the end of the seat belt.

3. The pretensioner according to claim 1 wherein the load bearing part comprises a sill anchorage.

4. The pretensioner according to claim 2 wherein the load bearing part comprises a sill anchorage.

5. The pretensioner according to claim 1 wherein the means for moving the second member comprises a force reservoir.

6. The pretensioner according to claim 2 wherein the means for moving the second member comprises a force reservoir.

7. The pretensioner according to claim 5 wherein the means for moving further comprises a piston connected to the second member and a cylinder housing the piston such that activation of the force reservoir drives the piston along the cylinder.

8. The pretensioner according to claim 6 wherein the means for moving further comprises a piston connected to the second member and a cylinder housing the piston such that activation of the force reservoir drives the piston along the cylinder.

9. The pretensioner according to claim 7 wherein the piston and cylinder are located below the first member.

10. The pretensioner according to claim 8 wherein the piston and cylinder are located below the first member.

11. The pretensioner according to claim 5 wherein the force reservoir comprises a gas generator that is pyrotechnically activated.

12. The pretensioner according to claim 6 wherein the force reservoir comprises a gas generator that is pyrotechnically activated.

13. The pretensioner according to claim 1 wherein the load bearing part of the vehicle is a longitudinal chassis member.

14. The pretensioner according to claim 1 wherein the crash sensor is activated when the vehicle exceeds a predetermined acceleration or deceleration threshold.

* * * * *